(12) United States Patent
Kuruba et al.

(10) Patent No.: US 11,554,718 B2
(45) Date of Patent: Jan. 17, 2023

(54) DRIVER ASSISTANCE FOR A COMBINATION

(71) Applicant: Connaught Electronics Ltd., Tuam (IE)

(72) Inventors: Naveen Kuruba, Tuam (IE); Alan Murphy, Tuam (IE); Alan Hanniffy, Tuam (IE)

(73) Assignee: Connaught Electronics Ltd., Tuam (IE)

( * ) Notice: Subject to any disclaimer, the term of this patent is extended or adjusted under 35 U.S.C. 154(b) by 0 days.

(21) Appl. No.: 17/634,830

(22) PCT Filed: Jul. 30, 2020

(86) PCT No.: PCT/EP2020/071461
§ 371 (c)(1),
(2) Date: Feb. 11, 2022

(87) PCT Pub. No.: WO2021/032434
PCT Pub. Date: Feb. 25, 2021

(65) Prior Publication Data
US 2022/0266749 A1    Aug. 25, 2022

(30) Foreign Application Priority Data
Aug. 16, 2019   (DE) ............... 10 2019 122 086.6

(51) Int. Cl.
*B60R 1/00* (2022.01)
*G06V 10/82* (2022.01)
(Continued)

(52) U.S. Cl.
CPC ............ *B60R 1/003* (2013.01); *B60R 1/26* (2022.01); *B60R 11/04* (2013.01); *G06V 10/50* (2022.01);
(Continued)

(58) Field of Classification Search
None
See application file for complete search history.

(56) References Cited

U.S. PATENT DOCUMENTS 9,854,209 B2   12/2017   Aich et al.
2008/0044061 A1   2/2008   Hongo
(Continued)

FOREIGN PATENT DOCUMENTS

DE   102015214611 A1   2/2017
DE   102017113469 A1   12/2018
(Continued)

OTHER PUBLICATIONS

Search Report issued in corresponding DE Patent Application No. 10 2019 122 086.6, dated Feb. 3, 2020 (4 pages).
(Continued)

*Primary Examiner* — Rebecca A Volentine
(74) *Attorney, Agent, or Firm* — Osha Bergman Watanabe & Burton LLP

(57) ABSTRACT

For driver assistance for a combination (8) with a motor vehicle (9) and a trailer (10), a first camera image (19) and a second camera image (20) are generated. A combined image (21) is generated by means of a computing unit (13) by superimposing the camera images (19, 20) such that the second camera image (20) covers a subsection of the first camera image (19), wherein a hitch angle (14) of the combination (8) is determined by means of the computing unit (13). State data of the combination (8) are determined by means of a sensor system (17) and it is determined whether the combination (8) moves forward or backward. The hitch angle (14) is determined based on the state data, if the combination (8) moves forward and based on a change of time-dependent image data, if the combination moves
(Continued)

backward. A position of the subsection is determined depending on the hitch angle (14).

12 Claims, 2 Drawing Sheets

(51) Int. Cl.
  *G06V 10/50*   (2022.01)
  *B60R 1/26*    (2022.01)
  *G06V 20/56*   (2022.01)
  *B60R 11/04*   (2006.01)
  *B60R 11/00*   (2006.01)
(52) U.S. Cl.
  CPC ............. *G06V 10/82* (2022.01); *G06V 20/56* (2022.01); *B60R 2011/004* (2013.01); *B60R 2300/105* (2013.01); *B60R 2300/303* (2013.01); *B60R 2300/802* (2013.01)

(56) References Cited

U.S. PATENT DOCUMENTS

| | | | |
|---|---|---|---|
| 2010/0171828 A1* | 7/2010 | Ishii | B62D 15/0275 348/135 |
| 2016/0366336 A1 | 12/2016 | Kuehnle et al. | |
| 2017/0280091 A1 | 9/2017 | Greenwood et al. | |
| 2017/0341583 A1 | 11/2017 | Zhang et al. | |
| 2018/0109762 A1 | 4/2018 | Aich et al. | |
| 2018/0124350 A1 | 5/2018 | Greenwood et al. | |
| 2018/0127024 A1* | 5/2018 | Pourrezaei Khaligh | B60D 1/245 |
| 2019/0176698 A1 | 6/2019 | Ward et al. | |
| 2019/0241126 A1* | 8/2019 | Murad | B60R 1/00 |
| 2019/0255998 A1 | 8/2019 | Finan et al. | |
| 2022/0153195 A1* | 5/2022 | Freeman-Powell | G06T 11/60 |

FOREIGN PATENT DOCUMENTS

| | | |
|---|---|---|
| DE | 102019102716 A1 | 8/2019 |
| EP | 3342645 A1 | 7/2018 |

OTHER PUBLICATIONS

International Search Report and Written Opinion issued in corresponding International Patent Application No. PCT/EP2020/071461, dated Nov. 6, 2020 (9 pages).

* cited by examiner

DRIVER ASSISTANCE FOR A COMBINATION

The invention relates to a method for driver assistance for a combination, the combination comprising a motor vehicle and a trailer, wherein a first camera image is generated by means of a first camera system arranged at the motor vehicle, a second camera image is generated by means of a second camera system arranged at the trailer, and a combined image is generated by means of a computing unit of the motor vehicle by superimposing the camera images such that the second camera image covers a subsection of the first camera image. Further, the invention relates to a corresponding driver assistance system as well as to a computer program and a computer-readable storage medium.

In a known system for driver assistance, two cameras are used, which are attached to a rear side of the motor vehicle and a rear side of the trailer, respectively. The resulting camera images are represented in a superimposed manner in the cockpit of the motor vehicle on a screen such that for a driver of the motor vehicle virtually a view through the trailer results. Thereby, it can be achieved that the view of the driver is less severely restricted by the trailer. Such a system is for example described in document EP 3 342 645 A1.

However, a disadvantage is in that in cornering or maneuvering operations, in which the motor vehicle and the trailer are not moved along a common longitudinal axis, the position of the trailer in the camera image of the motor vehicle camera can deviate from the position of the camera image of the trailer camera. Thereby, covered sections in the superimposed image result for the driver in that the camera image of the trailer camera covers actually free sections on the one hand, and in that parts of the trailer restrict the view on the other hand.

Therefore, it is an object of the present invention to specify an improved concept for driver assistance for a combination, wherein a view restriction for a driver of the combination is further reduced, in particular if the combination does not travel straight.

According to the invention, this object is solved by a method for driver assistance, a driver assistance system, a computer program and a computer-readable storage medium according to the independent claims. Advantageous developments and further embodiments are the subject matter of the dependent claims.

The improved concept is based on the idea to determine the position of a subsection in the combined image, which is covered by the camera image of a trailer camera system, depending on a hitch angle of the combination. Therein, the hitch angel is determined depending on state data or based on time-dependent image data, depending on whether the combination is moving forward or backward.

According to a first independent aspect of the improved concept, a method for driver assistance for a combination is specified, in particular for a driver of the combination, the combination comprising a motor vehicle and a trailer, wherein the trailer is in particular connected to the motor vehicle, in particular in rotatable manner with respect to the motor vehicle. A first camera image is generated by means of a first camera system arranged at the motor vehicle and a second camera image is generated by means of a second camera system arranged at the trailer. Time-dependent image data are generated by means of the second camera system. The first camera system can also be referred to as motor vehicle camera system and the second camera system can also be referred to as trailer camera system. By means of a computing unit of the motor vehicle, a combined image is generated by superimposing the first and the second camera image such that the second camera image covers a subsection of the first camera image. Therein, a hitch angle of the combination is determined by means of the computing unit. By means of the sensor system of the combination, state data of the combination are determined and the time-dependent image data is generated by means of the second camera system. It is determined by means of the computing unit, if the combination moves forward or backward. The hitch angle is determined by means of the computing unit based on the state data if the combination moves forward and based on a change of the time-dependent image data, if the combination moves backward. A position of the subsection, in particular within the combined image, is determined by means of the computing unit depending on the hitch angle.

In particular, the combined image is generated by means of a computing unit based on and corresponding to the position of the subsection determined depending on the hitch angle such that the position of the second camera image within the combined image is dependent on the hitch angle.

The first camera system is in particular connected to the motor vehicle or mounted on the motor vehicle, in particular on a rear side of the motor vehicle. Therein, the rear side of the motor vehicle corresponds to a side of the motor vehicle facing the trailer.

The second camera system is in particular connected to the trailer or mounted on this trailer, in particular on a rear side of the trailer. Therein, the rear side of the trailer corresponds to a side of the trailer facing away from the motor vehicle.

The first camera system comprises at least one first camera for generating the first camera image. The second camera system comprises at least one second camera for generating the second camera image. However, an orientation of the at least one first camera and the at least one second camera is in particular such that the respective viewing direction thereof is oriented parallel to a common longitudinal axis of the combination if the combination moves straight forward along the common longitudinal axis of the combination.

Here and in the following, "forward" and corresponding expressions denote a direction of travel of the combination, in which the motor vehicle tows the trailer. Here and in the following, "backward" and corresponding expressions denote a direction of travel of the combination, in which the motor vehicle pushes the trailer, thus in particular a direction of travel, which is not oriented to the front or forward.

In particular, the first camera system is arranged such that the first camera image shows at least a part of the trailer as well as at least a part of an environment of the motor vehicle, in particular around the trailer. In particular, the first camera image shows a front side of the trailer or a part of the front side of the trailer as well as optionally a left or a right side of the trailer depending on the hitch angle of the combination. Therein, the front side of the trailer is a side of the trailer facing the motor vehicle, thus which is opposite to the rear side of the trailer.

The second camera system is in particular arranged such that the second camera image shows an environment of the trailer, in particular an environment of the trailer, which the rear side of the trailer faces.

In the combined image, the second camera image is in particular smaller than the first image. In particular, an extension or size of the subsection corresponds to an extension or size of the second image in the combined image.

That the second camera image covers the subsection of the first camera image in the combined image, can for example be understood such that the subsection of the first camera image is not visible in the combined image and instead the second camera image is visible.

The position of the subsection is in particular a lateral or horizontal position of the subsection within the first camera image.

By the occlusion of the subsection with the second camera image, a part of the environment of the trailer, which is covered by the trailer on the first camera image, is made visible in the combined image. Thereby, the driver can see a larger area of the environment of the combination, in particular if the combined image is displayed on a display device or display of the motor vehicle.

By determining the subsection depending on the hitch angle and in particular by the corresponding positioning of the second camera image in the combined image depending on the hitch angle, the second camera image follows a relative movement in the combined image, in particular a rotational or pivoting movement, of the trailer with respect to the motor vehicle such that additional blind sections do not arise within the combined image by the relative movement or at least the size of such blind sections is restricted or reduced. For example, sections can be referred to as blind sections, in which the second camera image covers the first camera image although a part of the trailer is not at the corresponding location in the first camera image. In addition, sections can be referred to as blind sections, in which the trailer covers parts of the first camera image without being compensated for by corresponding superposition of the second camera image.

Thereby, a dynamic adaptation of the combined image is allowed such that view restriction for the driver due to the trailer is improved even upon rotational movements of the trailer with respect to the motor vehicle, thus with non-zero hitch angle.

The hitch angle is in particular a yaw angle of the trailer. Therein, the yaw angle of the trailer is in particular defined with respect to a longitudinal axis of the motor vehicle such that the hitch angle of the combination or the yaw angle of the trailer corresponds to an angle, which a longitudinal axis of the trailer forms with a longitudinal axis of the motor vehicle. Therein, the yaw or hitch angle is for example equal to zero if the two longitudinal axes coincide or are parallel to each other.

Therein, the longitudinal axes of the motor vehicle and the trailer correspond to a direction of movement of the combination in a neutral position of a steering system of the combination and the motor vehicle, respectively, in particular at a steering angle of the motor vehicle of zero degrees.

The first and the second camera image as well as the combined image can in particular be frames or parts of corresponding image sequences or videos.

In particular, the method steps of generating the camera images and the combined image, in particular including the determination of the hitch angle and the determination of the position of the subsection depending on the hitch angle, can be repeatedly, in particular periodically or continuously, performed such that the position of the subsection within the combined image can be dynamically, thus repeatedly, periodically or continuously, adapted to the corresponding hitch angle. Thereby, the position of the second camera image in the combined image is continuously adapted to the hitch angle.

The generation of the first and/or the second camera image can also comprise performing corresponding image corrections and/or image transformations. For example, a compensation for wide-angle artifacts, for example fisheye effects, or other image artifacts or distortions can be performed to generate the respective camera images. In particular, the generation of the camera images can also comprise a respective perspective adaptation and/or a respective cropping of the underlying acquisitions of the camera systems. The corresponding corrections or transformations can be performed by a respective further computing unit of the respective camera system or by a part of the computing unit.

The computing unit in particular receives the state data via a bus system, in particular a CAN bus system, of the motor vehicle or of the combination, which in particular connects the computing unit to the sensor system.

In particular, the state data contains input variables, for example time-dependent input variables, for odometric determination of the hitch angle. In particular, the state data includes a steering angle of the motor vehicle or combination, for example a steering wheel angle and/or a wheel angle.

Therein, by an odometric determination of the hitch angle, it can for example be understood that the hitch angle is determined from measured variables, in particular the input variables, of the sensor system at certain points of time. Alternatively or additionally to the steering angle, thereto, the state data can comprise measured variables with respect to a chassis of the combination, for example a wheel speed or a wheel rotational direction, with respect to a yaw rate of the motor vehicle and/or with respect to a position, for example GNSS coordinates, of the motor vehicle or the combination.

The state data, in particular the steering angle, for example a temporal progression of the steering angle, allows estimating and thereby determining the hitch angle, in particular based on an odometric model, in particular in forward travel of the combination.

The determination of the hitch angle based on the state data, for example by means of the odometric model, has the advantage that a computing effort for the computing unit is low thereto.

The computing unit can determine whether the combination moves forward or backward, in particular based on the state data.

In particular, the time-dependent image data at a given point of time corresponds to the second camera image.

Determining the hitch angle based on the temporal change of the time dependent image data has the advantage that the hitch angle can be determined independently of a direction of movement of the combination since the change of the time-dependent image data uniquely represents the movement of the trailer without having to resort to a model with optionally restricted validity.

By the combination of the two approaches for determining the hitch angle, the viewing restriction can be reduced, as described, independently of the fact if the combination moves forward or backward. In addition, a required computing effort can be reduced in that it is resorted to the odometric determination of the hitch angle upon forward travel.

According to at least one embodiment, the hitch angle is determined based on the state data odometrically, if the combination moves forward.

According to at least one embodiment, the steering angle of the motor vehicle is determined by means of a steering angle sensor of the sensor system for acquiring the state data and the hitch angle is determined based on the determined steering angle by means of the computing unit.

In particular, the steering angle is determined at different points of time and the hitch angle is determined based on corresponding values of the steering angle at the different points of time, in particular based on a change of the steering angle between the different points of time.

According to at least one embodiment of the method for driver assistance, the combined image is displayed by means of a display device of the motor vehicle, for example by means of a display, in particular displayed to the driver.

According to at least one embodiment, a set of motion vectors is generated based on the time-dependent image data by means of the computing unit and the hitch angle is determined based on the set of motion vectors by means of the computing unit.

According to at least one embodiment, a block matching algorithm is applied to the time-dependent image data by means of the computing unit to determine the hitch angle.

According to at least one embodiment, the position of the subsection is determined depending on the hitch angle by means of the computing unit such that occlusion of a field of view of the first camera system by the trailer is at least partially compensated for in the combined image or by the generation of the combined image.

Therein, the field of view of the first camera system in particular corresponds to a part of the environment of the motor vehicle, which can be represented by means of the first camera image. Therein, the occlusion of the field of view by the trailer corresponds to the circumstance that in the first camera image parts of the environment of the combination or of the motor vehicle are not visible in the first camera image by the trailer.

According to a further independent aspect of the improved concept, a driver assistance system for a combination or a motor vehicle is specified, wherein the combination comprises the motor vehicle and a trailer. The driver assistance system comprises a first camera system, a second camera system and a computing unit. The first camera system can be or is arranged at the motor vehicle and configured to generate a first camera image. The second camera system can be or is arranged at the trailer and configured to generate a second camera image as well as time-dependent image data. The computing unit is configured to superimpose the first and the second camera image for generating a combined image such that the second camera image covers a subsection of the first camera image. Therein, the computing unit is configured or programmed to determine a hitch angle of the combination. The driver assistance system is connectable to a sensor, in particular of the combination or the motor vehicle, or includes the sensor system and is connected to it. The sensor system is configured to determine state data of the combination. The second camera system is configured to generate time-dependent image data. The computing unit is configured or programmed to determine if the combination moves forward or backward. The computing unit is configured to determine the hitch angle based on the state data if the combination moves forward. The computing unit is configured to determine the hitch angle based on the change of the time-dependent image data if the combination moves backward. The computing unit is configured to determine a position of the subsection depending on the hitch angle.

The computing unit is, in particular, configured or programmed to acquire the state data, in particular via a CAN bus system or another bus system of the combination or of the motor vehicle, to determine the hitch angle based on the state data.

According to at least one embodiment, the driver assistance system is connectable to a steering angle sensor of the sensor system or comprises the steering angle sensor and is connected to it. The steering angle sensor is configured to determine a steering angle of the motor vehicle. The computing unit is configured or programmed to acquire the steering angle and to determine the hitch angle based on the steering angle.

According to at least one embodiment, the computing unit is configured or programmed to apply a block matching algorithm to the time-dependent image data to determine the hitch angle.

Further embodiments of the driver assistance system according to the improved concept immediately result from the different configurations of the method according to the improved concept and vice versa. In particular, a driver assistance system, for example a computing unit of the driver assistance system, is configured or programmed to perform a method according to the improved concept or the driver assistance system performs a method according to the improved concept.

According to a further independent aspect of the improved concept, a motor vehicle is specified, which comprises a driver assistance system according to the improved concept.

According to a further independent aspect of the improved concept, a combination comprising a motor vehicle and a trailer is specified, wherein the combination comprises a driver assistance system according to the improved concept.

According to a further independent aspect of the improved concept, a computer program with instructions is specified, wherein the instructions, upon execution of the computer program by a driver assistance system according to the improved concept, in particular by the computing unit of the driver assistance system, cause the driver assistance system to perform a method according to the improved concept.

In particular, upon execution of the computer program, the instructions cause the driver assistance system to perform a method according to the improved concept if the driver assistance system comprises components required thereto.

According to a further independent aspect of the improved concept, a computer-readable storage medium is specified, on which a computer program according to the improved concept is stored.

Further features of the invention are apparent from the claims, the figures and the description of figures. The features and feature combinations mentioned above in the description as well as the features and feature combinations mentioned below in the description of figures and/or shown in the figures alone are usable not only in the respectively specified combination, but also in other combinations without departing from the scope of the invention. Thus, implementations are also to be considered as encompassed and disclosed by the invention, which are not explicitly shown in the figures and explained, but arise from and can be generated by separated feature combinations from the explained implementations. Implementations and feature combinations are also to be considered as disclosed, which thus do not comprise all of the features of an originally formulated independent claim. Moreover, implementations and feature combinations are to be considered as disclosed, in particular by the implementations set out above, which extend beyond or deviate from the feature combinations set out in the relations of the claims.

In the following, the invention is explained in more detail based on specific embodiments and associated schematic drawings. In the figures, identical or functionally identical elements are provided with identical reference characters. The description of identical or functionally identical elements is not necessarily repeated in various figures, as appropriate.

Figure 1:
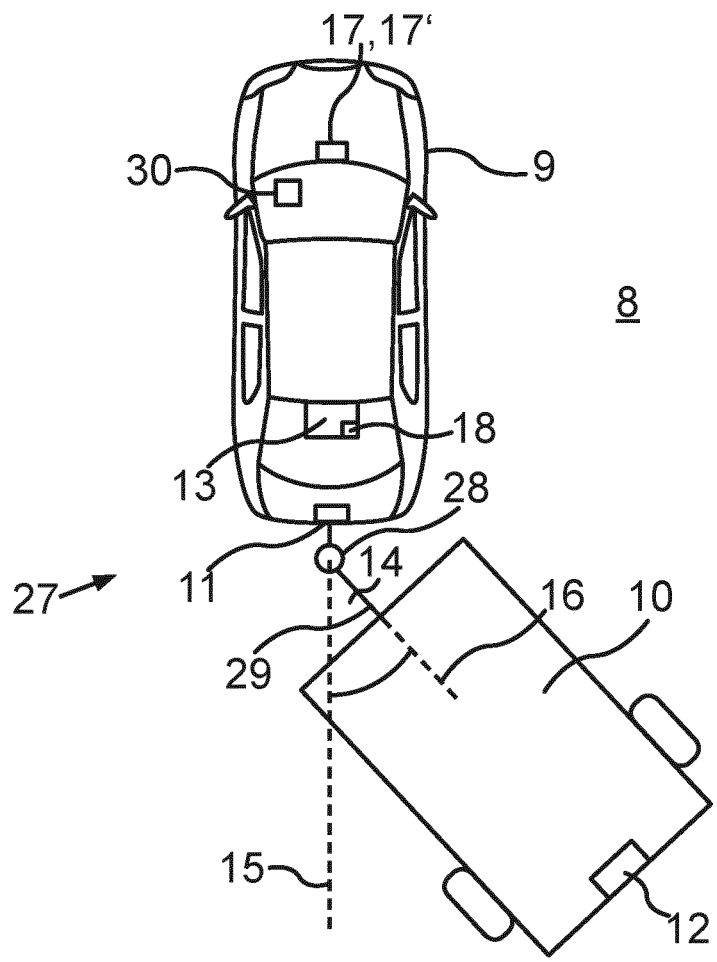
FIG. 1 shows a combination with an exemplary embodiment of a driver assistance system according to the improved concept.

In FIG. 1, a combination 8 is shown, which comprises a motor vehicle 9 and a trailer 10.

The motor vehicle 9 comprises a tow bar 28, by means of which the trailer 10, in particular a drawbar 29 of the trailer 10, is rotatably connected to the motor vehicle 9. The motor vehicle 9 has a longitudinal axis 15 and the trailer 10 has a longitudinal axis 16, which for example corresponds to an orientation or longitudinal axis of the drawbar 29.

The longitudinal axis 16 of the trailer forms a hitch angle 14 of the combination with the longitudinal axis 15 of the motor vehicle 9, which in particular corresponds to a yaw angle of the trailer with respect to the motor vehicle 9 and the longitudinal axis 15 of the motor vehicle 9, respectively. For example, the hitch angle 14 is defined such that the hitch angle is equal to zero with coinciding orientation of the longitudinal axis 15 and the longitudinal axis 16.

The combination 8 comprises an exemplary embodiment of a driver assistance system 27 according to the improved concept.

The driver assistance system 27 comprises a first camera 11, which is arranged on a rear side of the motor vehicle 9 facing the trailer 10 and for example is configured as the reversing camera of the motor vehicle.

The driver assistance system 27 additionally comprises a second camera 12, which is arranged on a rear side of the trailer 10 facing away from the motor vehicle 9.

The driver assistance system 27 additionally comprises a computing unit 13, which is coupled to the cameras 11, 12. In particular, the computing unit 13 can obtain respective time-dependent image data from the first camera 11 and the second camera 12.

The motor vehicle 9 or the combination 8 for example comprises a sensor system 17, wherein the sensor system 17 in particular comprises a steering angle sensor 17' of the motor vehicle 9. Optionally, the sensor system 17 can be part of the driver assistance system 27.

Figure 2:
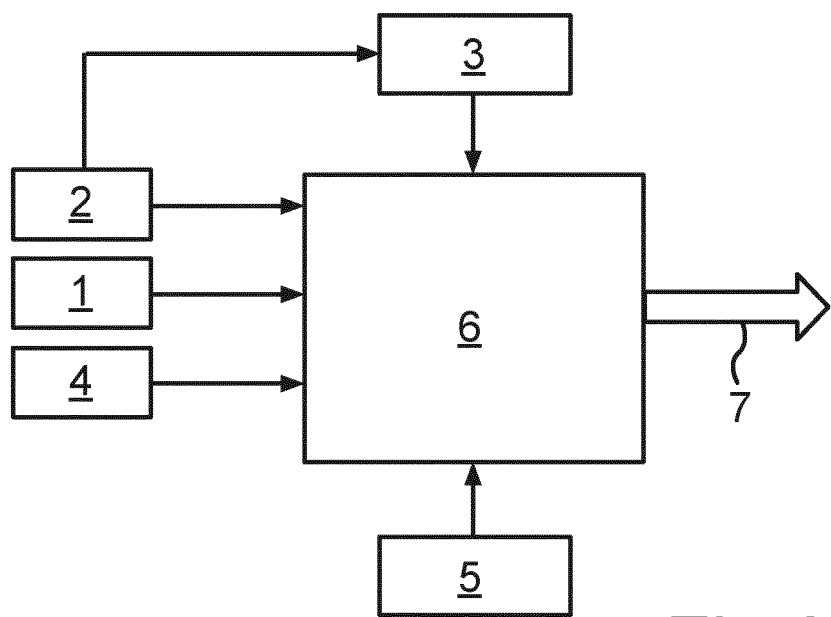
FIG. 2 shows a schematic flow diagram of an exemplary embodiment of a method according to the improved concept.
Figure 3:
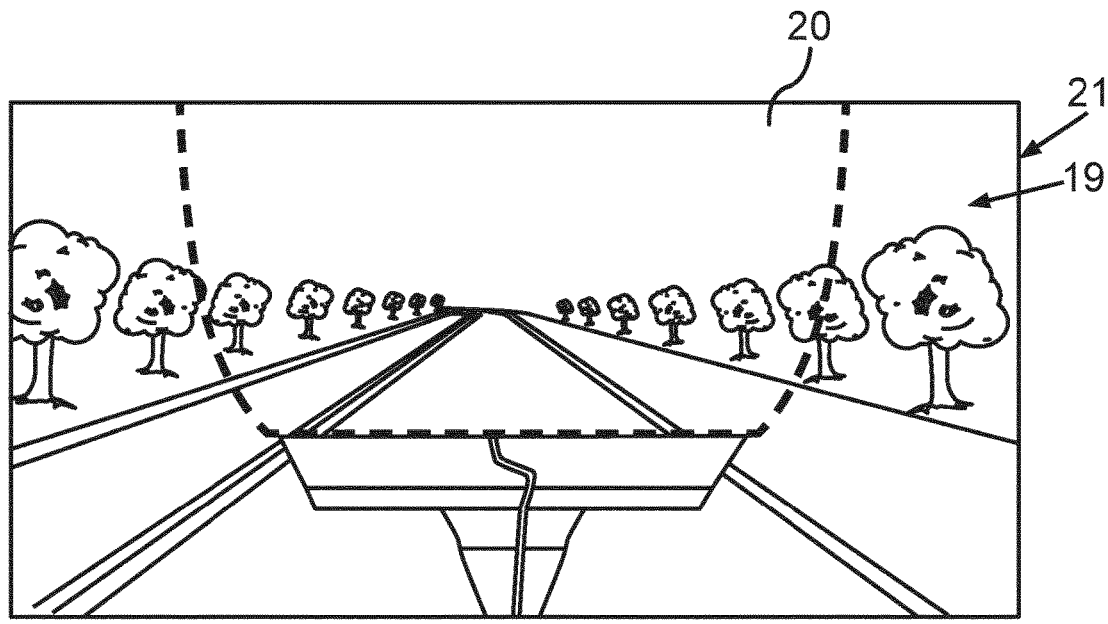
FIG. 3 shows a schematic representation of a combined image in a first situation.
Figure 4:
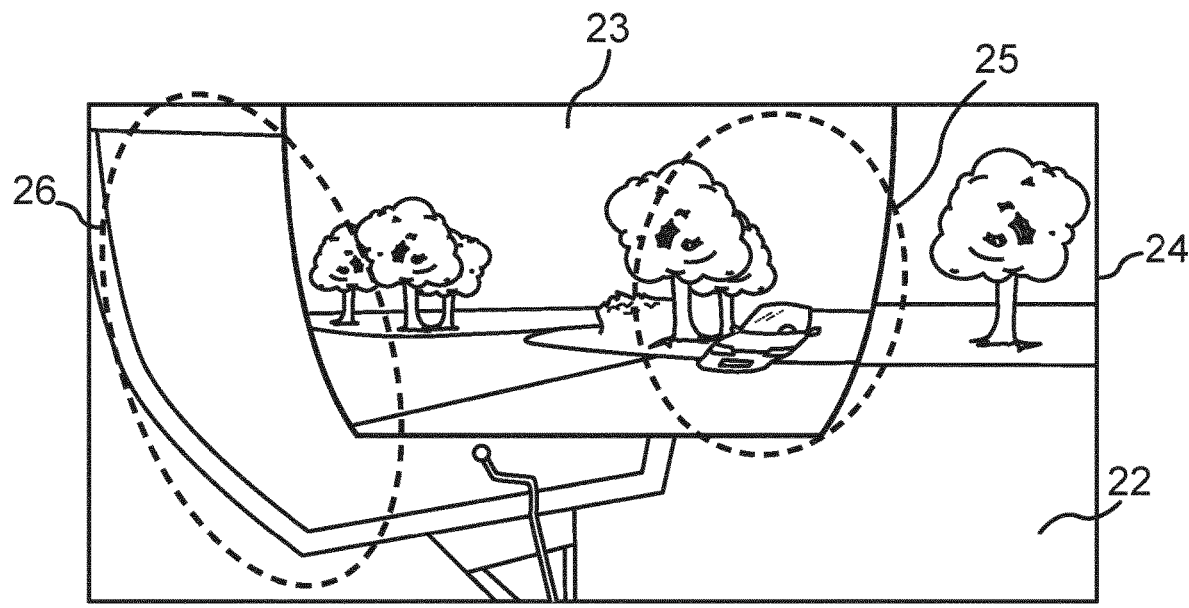
FIG. 4 shows a schematic representation of a combined image in a second situation.

In the following, the functionality of the driver assistance system 27 is described with reference to an exemplary embodiment of a method according to the improved concept, as it is schematically shown in FIG. 2, and with reference to exemplary combined images 21, 24, as they are shown in FIG. 3 and FIG. 4, respectively.

In FIG. 2, a schematic flow diagram of an exemplary embodiment of a method for driver assistance according to the improved concept is illustrated.

In step 1 of the method, a first camera image 19 is generated by means of the first camera 11. In step 2 of the method, a second camera image 20 is generated by means of the second camera 12. The first and the second camera image 19, 20 or respective corresponding image data are transmitted from the cameras 11, 12 to the computing unit 13. In step 3 of the method, the computing unit 13 determines the hitch angle 14.

In an optional step 4 of the method, the first and/or the second camera image 19, 20 can for example be adapted, corrected or transformed by means of image processing algorithms.

In an optional step 5 of the method, calibration data of the cameras 11, 12 can be acquired or retrieved by means of the computing unit.

In step 6 of the method, the computing unit 13 determines a combined image 21 from the camera images 19, 20. Therein, the camera images 19, 20 are superimposed such that the second camera image 20 covers a subsection of the first camera image 19. A corresponding representation of the combined image 21 is illustrated in FIG. 3. Therein, the computing unit can optionally take into account the calibration data and/or results of the step 4, as appropriate.

In FIG. 3, the combination 8 for example moves straight forward. The subsection covered by the second camera image 20 at least partially corresponds to a position of the trailer 10 as it would be seen on the first camera image 21 if the second camera image 20 would not be superimposed. By the superposition of the camera images 19, 20, the common information of both camera images 19, 20 can be represented in the combined image 21 such that the trailer 10 becomes virtually partially transparent or invisible.

The combined image 21 can for example be displayed on a display device 30, for example a display of an infotainment system or a head-up display of the motor vehicle 9. Therefore, the driver of the motor vehicle 9 can resort to the extended information of the combined image 21 and utilize the correspondingly improved view in particular in maneuvering operations.

In that the position, in particular the lateral position, of the subsection and thus of the second camera image 20 within the combined image 21 has been determined adapted depending on the hitch angle 14, a situation as it is illustrated in FIG. 4 is avoided according to the improved concept.

The computing unit 13 can determine the hitch angle for example based on state data of the sensor system 17, in particular based on a steering angle, which has been determined or measured by means of the steering angle sensor 17, in step 3 of the method, if the combination 8 moves forward. To this end, the computing unit 13 can for example resort to an odometric model, which is able to assign a value, in particular an estimated value, for the hitch angle 14 to the steering angle or a temporal progression of the steering angle.

If the combination 8 moves backward, the computing unit 13 can analyze time-dependent image data of the second camera 12 and determine the hitch angle based on temporal changes of the time-dependent image data of the second camera 12 in step 3.

Thereto, the computing unit 13 can for example apply a block matching algorithm to the time-dependent image data.

In the following, an embodiment for determining the hitch angle 14 depending on the time-dependent image data of the second camera 12 is described. First, camera images are captured by the second camera 12 at a first and at a second point of time. The camera images at the first and the second point of time, which can also be referred to as first and second image in the following, are for example conditioned such that they represent a plan view of the combination 8.

For calculating image motion vectors, the first and/or the second image can each be divided into multiple blocks. Certain blocks can be combined to a region of interest. The computing unit 13 can match corresponding blocks of the first image to associated blocks of the second image to identify the movement of the combination 8 and corresponding motion vectors. For matching the blocks, a multi-dimensional block matching method and/or an artificial neural network can for example be employed. In particular, typical block matching methods can be employed as they are known in the field of the video compression.

For example, a deviation value of the blocks matched to each other can be calculated based on a deviation function. The deviation function can comprise a correlation function, a cross-correlation function, a sum of absolute differences, a sum of square differences, a function with respect to transformed differences or a function for frequency spectrum analysis.

Then, the computing unit 13 can for example determine the hitch angle 14 depending on the deviation value.

In FIG. 4, a further combined image 24 is illustrated, which has not been generated by means of a method according to the improved concept or by means of a driver assistance system according to the improved concept. The combined image 24 was generated by superposition of a further first camera image 22 of a reversing camera and a further second camera image 23 of a trailer camera, wherein the position of the subsection, which the second further camera image 23 covers, has been statically determined, thus independently of a hitch angle. Therefore, image sections arise in a first section 25 and in a second section 26, in which image information is displayed to the driver on the further combined image 24, which is not useful for him and cover his view. In the first section 25, the further second camera image 23 for example covers a part of the environment, which actually could be displayed by the further first camera image 22. The trailer covers a part of the environment in the second section 26, which actually could be represented by the further second camera image 23.

By a method and a driver assistance system according to the improved concept, respectively, the disadvantageous situation of FIG. 4 can be avoided.

Based on the improved concept, as described, the position of the second camera image can be dynamically adapted to prevent blind sections. Thereto, the computing unit can employ odometric data or an odometric model and/or a computer vision algorithm. Thereby, disadvantages of existing systems are overcome if the motor vehicle and the trailer are not oriented along a common longitudinal axis. In particular, safely reversing and/or parking the combination can thereby be facilitated.

The improved concept can in particular be employed independently of the type of the trailer and the motor vehicle.

The invention claimed is:

1. A method for driver assistance for a combination comprising a motor vehicle and a trailer, comprising:
    generating a first camera image using a first camera system arranged at the motor vehicle;
    generating a second camera image and time-dependent image data using a second camera system arranged at the trailer;
    determining a hitch angle of the combination by a computing unit,
        wherein state data is determined by a sensor system of the combination,
        wherein the computing unit is configured to determine if the combination is moving forward or backward, and
        wherein the hitch angle is determined:
            based on the state data, when the computing unit determines that the combination is moving forward, and
            based on a change of the time-dependent image data when the computing unit determines that the combination is moving backward;
    determining a position, by the computing unit, depending on the hitch angle; and
    generating a combined image by the computing unit by superimposing the first camera image and the second camera image using the position such that the second camera image covers, at least in part, an occlusion of a field of view of the first camera image,
        wherein the occlusion of the field of view is caused by the trailer.

2. The method according to claim 1, wherein the hitch angle is determined odometrically based on the state data, when the combination is moving forward.

3. The method according to claim 1, wherein for capturing the state data, a steering angle of the motor vehicle is determined by means of a steering angle sensor of the sensor system, and wherein the hitch angle is determined by the computing unit based on the steering angle.

4. The method according to claim 3, wherein the steering angle is determined at different points of time and the hitch angle is determined based on corresponding values of the steering angle at the different points of time.

5. The method according to claim 1, wherein a block matching algorithm is applied to the time-dependent image data by the computing unit to determine the hitch angle.

6. A driver assistance system for a combination comprising a motor vehicle and a trailer, the driver assistance system comprising:
    a first camera system capable of being arranged at the motor vehicle, configured to generate a first camera image;
    a second camera system capable of being arranged at the trailer, configured to generate a second camera image and time dependent image data; and
    a computing unit configured to superimpose the first camera image and the second camera image using a position for generating a combined image such that the second camera image covers, at least in part, an occlusion of a field of view of the first camera image and to determine a hitch angle of the combination,
        wherein the occlusion of the field of view is caused by the trailer,
        wherein the driver assistance system is connectable to a sensor system, which can determine state data of the combination, wherein:
        the computing unit is configured to determine if the combination is moving forward or backward, and if the combination is moving forward, to determine the hitch angle based on the state data, and if the combination is moving backward, to determine the hitch angle based on a change of time-dependent image data, and the computing unit is configured to determine the position depending on the hitch angle.

7. The driver assistance system according to claim 6, wherein the computing unit is configured to receive the state data via a bus system of the combination or of the motor vehicle.

8. The driver assistance system according to claim 6, wherein the driver assistance system is connectable to a steering angle sensor of the sensor system, which can determine a steering angle of the motor vehicle, and the computing unit is configured to determine the hitch angle based on the steering angle.

9. The driver assistance system according to claim 6, wherein the computing unit is configured to apply a block matching algorithm to the time-dependent image data to determine the hitch angle.

10. A motor vehicle with a driver assistance system according to claim 6.

11. A combination with a motor vehicle according to claim 10 and a trailer.

12. A non-transitory computer-readable storage medium storing instructions executable by a computing unit, the instructions comprising functionality for:
   generating a first camera image using a first camera system arranged at a motor vehicle;
   generating a second camera image and time-dependent image data using a second camera system arranged at a trailer;
   determining a hitch angle of a combination by the computing unit,
   wherein the combination comprises the motor vehicle and the trailer;
   wherein state data is determined by a sensor system of the combination,
   wherein the computing unit is configured to determine if the combination is moving forward or backward, and
   wherein the hitch angle is determined:
      based on the state data when the combination is moving forward, and
      based on a change of the time-dependent image data when the combination is moving backward;
   determining a position, by the computing unit, depending on the hitch angle; and
   generating a combined image by the computing unit by superimposing the first camera image and the second camera image using the position such that the second camera image covers, at least in part, an occlusion of a field of view of the first camera image,
   wherein the occlusion of the field of view is caused by the trailer.

* * * * *